United States Patent [19]

Powers

[11] Patent Number: 5,252,193

[45] Date of Patent: Oct. 12, 1993

[54] CONTROLLED ROUGHENING OF REINFORCED CATION EXCHANGE MEMBRANE

[75] Inventor: John D. Powers, Fayetteville, N.C.

[73] Assignee: E. I. Du Pont de Nemours and Company, Wilmington, Del.

[21] Appl. No.: 787,662

[22] Filed: Nov. 4, 1991

[51] Int. Cl.$^5$ ............................................. C25B 13/00
[52] U.S. Cl. ..................................... 204/252; 204/296
[58] Field of Search ................... 204/296, 252, 282; 521/27; 427/307, 243, 393.5, 385.5; 51/281 R

[56] References Cited

U.S. PATENT DOCUMENTS

| | | | |
|---|---|---|---|
| 2,393,967 | 2/1946 | Brubaker | 260/80 |
| 2,559,752 | 7/1951 | Berry | 260/29.6 |
| 2,593,583 | 4/1952 | Lontz | 260/92.1 |
| 2,776,465 | 1/1957 | Smith | 28/82 |
| 3,282,875 | 11/1966 | Connolly et al. | 260/29.6 |
| 3,641,104 | 2/1972 | Anderson et al. | 260/465.6 |
| 3,718,627 | 2/1973 | Grot | 260/79.3 |
| 3,852,326 | 12/1974 | Nottke | 260/465.6 |
| 4,065,366 | 12/1977 | Oda et al. | 204/98 |
| 4,116,888 | 9/1978 | Ukihashi et al. | 521/31 |
| 4,138,426 | 2/1979 | England | 260/465.6 |
| 4,178,218 | 12/1979 | Seko | 204/93 |
| 4,267,364 | 5/1981 | Grot et al. | 560/183 |
| 4,444,638 | 4/1984 | Maloney | 204/296 |
| 4,461,682 | 7/1984 | Oda et al. | 204/98 |
| 4,468,301 | 8/1984 | Oda et al. | 204/98 |
| 4,487,668 | 12/1984 | England et al. | 204/98 |
| 4,518,470 | 5/1985 | Oda et al. | 204/98 |
| 4,561,946 | 12/1985 | Suhara et al. | 204/98 |
| 4,900,408 | 2/1990 | Powers | 204/296 |
| 4,909,912 | 3/1990 | Oda et al. | 204/98 |

FOREIGN PATENT DOCUMENTS

| | | | |
|---|---|---|---|
| 0041737 | 6/1981 | European Pat. Off. | |
| 0050188 | 4/1982 | European Pat. Off. | |
| 5190275 | 2/1978 | Japan | |
| 55111811 | 3/1982 | Japan | |
| 0176223 | 10/1983 | Japan | 521/27 |
| 57102998 | 12/1983 | Japan | |
| 57135211 | 2/1984 | Japan | |
| 1518387 | 8/1976 | United Kingdom | |
| 2053902 | 5/1980 | United Kingdom | |

*Primary Examiner*—Kathryn Gorgos

[57] ABSTRACT

A reinforced fluorinated cation exchange membrane for the electrolysis of alkali halide solutions is reinforced with fabric containing both sacrificial and permanent fibers in which the anolyte surface of the membrane is abraded to expose some of the reinforcement crossover points. A process for abrading the membrane and an electrolytic cell using the membrane are also claimed. The preferred method of abrasion is continuous sanding. The abraded membrane improves the current efficiency of the electrolytic cell.

6 Claims, No Drawings

CONTROLLED ROUGHENING OF REINFORCED CATION EXCHANGE MEMBRANE

FIELD OF THE INVENTION

The present invention relates to electrolytic cells containing ion exchange membranes. It particularly relates to electrolytic cells suitable for the electrolysis of aqueous solutions of alkali metal halides. More particularly, the present invention relates to a novel cation exchange membrane containing sacrificial and permanent reinforcement wherein some of the sacrificial fiber channels are exposed to the anolyte by surface roughening of the membrane.

BACKGROUND OF THE INVENTION

The use of an ion exchange membrane in an electrolytic cell to produce an alkali metal hydroxide by electrolyzing an aqueous solution of an alkali metal chloride is well known. Much of the technology in this area has focused on improvements to the materials, composition and configuration of the ion exchange membranes, so as to reduce cell voltage and increase current efficiency but maintain the strength and durability of the membrane.

It is possible to apply a porous non-electrode layer on at least one side of a cation exchange membrane for electrolysis of an alkali metal chloride solution. The coating reduces the cell voltage. The coating may be made of metal oxides, metal carbides and the like.

The prior art also discloses the use of a membrane with at least one roughened surface which contacts or is located within 20 mm of the corresponding electrode. The advantage taught is the reduction of cell voltage. While the prior art discloses methods of roughening the surface, there is no mention of improvement to current efficiency of the cell. In addition, the prior art does not mention the time or extent of sanding or roughening required to improve the membrane. The prior art also does not contemplate the importance of baring any, let alone a certain proportion, of the crossover points of the reinforcing fabric as a criterion of the desirable degree of roughening.

It is also possible to introduce channels on the anolyte surface of the membrane. The channels are achieved by using a mixture of reinforcing and sacrificial fibers, and later removing the sacrificial fibers. The channel-containing membrane does not, however, achieve the increase in current efficiency of the present invention. Further, the method of making this channel-containing membrane is defective because it is not possible to make the desired "degree of openness" reproducibly.

Both cell voltage and current efficiency are important in the electrolysis of metal chloride solutions in order to reduce the consumption of electric power, a major factor in the economics of chloralkali production. Cell voltage should be minimized and current efficiency should be maximized. Because of the importance of power consumption and the large scale on which this electrolysis is conducted, one of the problems to be solved is to achieve even a small increase in current efficiency without any increase in cell voltage.

In narrow gap and zero gap cells, cell shutdowns occasionally occur, sometimes resulting in undesirable contamination of the membrane with Nickel or other metals picked up from the cathode. This problem is greatly reduced by the present invention.

Variations in voltage of the electrolytic cell represent another problem. For example, heat balance to a chloralkali cell can be upset by voltage cycles of as little as 30–50 mV. If constant temperature is not maintained, the membrane will not operate at equilibrium condition, and current efficiency can be undesirably affected. Furthermore, small changes in voltage can contribute to unsteady current density within the membrane. This, too, can lead to undesirable decline in current efficiency. In systems operating with multiple electrolytic cells, current will be shunted to other cells operating at lower voltage. This adversely changes the current balance, heat balance, and ultimately performance of the cell. Finally, if the membrane is not operated in equilibrium, other operating variables become more difficult to control. For instance, water transport can be effected, and as a result, undesired changes in caustic concentration and current efficiency can occur. The problem of voltage variability is greatly reduced by the present invention. These problems and other problems apparent to one skilled in the art are solved by the present invention, without forfeiting the advantages of the prior art.

SUMMARY OF THE INVENTION

The present invention is a reinforced fluorinated cation exchange membrane for the electrolysis of an alkali metal halide solution containing at least one and preferably two or more polymer layers in which the sacrificial and permanent reinforcement for the membrane are in close proximity to the anolyte, such that by applying appropriate surface roughening techniques about 25% of the crossover points involving at least one sacrificial fiber are exposed to bulk anolyte, but the reinforcement is still anchored in the membrane firmly enough to remain in place during subsequent handling. The percentage of crossover points of the exposed sacrificial fiber channels is preferably 25 to 75%, most preferably 30 to 50%. The preferred process used to make the novel membrane is continuous sanding.

DETAILED DESCRIPTION OF THE INVENTION

A cation exchange membrane contains at least one layer and preferably two or more layers of different cation exchange polymers. The layers may be different in chemical composition or equivalent weight. For example, a membrane containing one layer may be made from a so-called carboxyl layer or a so-called sulfunyl layer. A bimembrane may contain two carboxyl layers of different composition or equivalent weight, or two sulfonyl layers of different composition or equivalent weight, or preferably one carboxyl layer and one sulfonyl layer. The term "carboxyl" includes free acid, —COOH, or a salt such as —COONa, or their precursor such as —COOCH$_3$. Likewise, the term "sulfonyl" includes free acid, —SO$_3$H, or a salt such as —SO$_3$Na, or their precursor such as —SO$_2$F.

The term "fluorinated polymer", used herein for carboxylic and for sulfonic polymers, means a polymer in which, after loss of any R group by hydrolysis to ion exchange form, the number of F atoms is at least 90% of the total number of F, H and Cl atoms in the polymer. For membranes in chloralkali cells, perfluorinated polymers are preferred, though the R in any —COOR group need not be fluorinated because it is lost during hydrolysis.

The carboxylic polymers with which the present invention is concerned have a fluorocarbon backbone chain to which are attached the functional groups or pendant side chains which in turn carry the functional groups. When the polymer is in meltfabricable form, the pendant side chains can contain, for example, $-[-CFZ-]_t-W$ groups wherein Z is F or $CF_3$, t is 1 to 12, and W is $-COOR$ or $-CN$, wherein R is lower alkyl. Preferably, the functional group in the side chains of the polymer will be present in terminal $O-[-CZF-]_t-W$ groups wherein t is 1 to 3.

Polymers containing $OCF_2CF(CF_3)_mOCF_2CF\{CF_3\}CN$ side chains, in which m is 0, 1, 2, 3, or 4, are disclosed in U.S. Pat. No. 3,852,326. Polymers containing $-(CF_2CFZ)_mOCF_2COOR$ side chains, where Z and R have the meaning defined above and m is 0, 1 or 2 (preferably 1) are disclosed in U.S. Pat. No. 4,267,364.

Polymers containing terminal $-O(CF_2)_vW$ groups, where W is defined above and v is from 2 to 12, are preferred. They are disclosed in U.S. Pat. Nos. 3,641,104, 4,178,218, 4,116,888, British Patent No. 2,053,902, EP No. 41737 and British Patent No. 1,518,387. These groups may be part of $-(OCF_2CFY)_m-O-(CF_2)V-W$ side chains, where $Y=F$, $CF_3$ or $CF_2Cl$. Especially preferred are polymers containing such side chains where v is 2, which are described in U.S. Pat. Nos. 4,138,426 and 4,487,668, and where v is 3, which are described in U.S. Pat. No. 4,065,366. Among these polymers, those with $m=1$ and $Y=CF_3$ are most preferred. The foregoing references also describe how to make these polymers.

The sulfonyl polymers with which the present invention is concerned are fluorinated polymers with side chains containing the group $-CF_2CFR_fSO_2X$, wherein $R_f$ is F, Cl, $CF_2Cl$ or a $C_1$ to $C_{10}$ perfluoroalkyl radical, and X is F or Cl, preferably F. Ordinarily, the side chains will contain $-OCF_2CF_2CF_2SO_2X$ or $-OCF_2CF_2SO_2F$ groups, preferably the latter. For use in chloralkali membranes, perfluorinated polymers are preferred. Polymers containing the side chain $-OCF_2CF\{CF_3\}O)_k-(CF_2)_j-SO_2F$, where k is 0 or 1 and j is 3, 4, or 5, may be used. These are described in British Patent No. 2,053,902. Polymers containing the side chain $-CF_2CF_2SO_2X$ are described in U.S. Pat. No. 3,718,627.

Preferred sulfonyl polymers contain the side chain $-(OCF_2CFY)_r-OCF_2CFR_fSO_2X$, where $R_f$, Y and X are defined above and r is 1, 2, or 3, and are described in U.S. Pat. No. 3,282,875. Especially preferred are sulfonyl copolymers containing the side chain- $OCF_2CF\{CF_3\}OCF_2CF_2SO_2F$.

Polymerization can be carried out by the methods described in the above references. Especially useful is solution polymerization using $ClF_2CFCl_2$ solvent and $(CF_3CF_2COO)_2$ initiator. Polymerization can also be carried out by aqueous granular polymerization as in U.S. Pat. No. 2,393,967, or aqueous dispersion polymerization as in U.S. Pat. No. 2,559,752 followed by coagulation as in U.S. Pat. No. 2,593,583.

The perfluoro ion exchange polymer is a copolymer of tetrafluoroethylene with one or more of the functional comonomers disclosed herein. The ratio of tetrafluoroethylene to functional comonomer on a mole basis is 1.5 to 5.6:1. For each comonomer, the most preferred ratio of tetrafluoroethylene to functional comonomer is determined by experiment.

The membranes of the invention are prepared from component polymer films which suitably have a thickness ranging from as low as about 13 micrometers up to about 150 micrometers. As the membrane is preferably prepared from two or three such films, the total thickness of polymer films used in making the resulting membrane will generally lie in the range of about 50 to 250 micrometers, preferably 75 to 200 micrometers, most preferably about 75 to 150 micrometers.

The customary way to specify the structural composition of membranes in this field of art is to specify the polymer composition, mole ratio of tetrafluoroethylene to functional comonomer, and thickness of the polymer films in melt-fabricable form, and the type of reinforcing fabric, from which the starting membrane is fabricated. This may be done, in the case of the immediate product membrane and the hydrolyzed ion exchange membrane made therefrom, because (1) the thickness of a reinforced membrane is not uniform, being thicker at the cross-over points of the reinforcing fabric and thinner elsewhere, and measurement made by calipers or micrometer indicates only the maximum thickness, and (2) measurement by cross-sectioning, making a photomicrograph, and measuring on the photograph is laborious and time-consuming. Furthermore, in the case of the hydrolyzed ion-exchange membrane, the measured thickness varies depending on whether the membrane is dry or swollen with water or an electrolyte, and even depending on the ionic species and ionic strength of the electrolyte, even though the amount of polymer remains constant.

The web of support material is suitably a fabric, preferably woven or knitted fabric. The web may consist of both reinforcement members and sacrificial members. Preferably, the web of support material should be no further than 50 micrometers, most preferably no further than 15 micrometers, from the anolyte surface of the membrane, to shorten the abrasion process.

In the case of woven fabric, weaves such as plain weaves, ordinary basketweave, leno weave, triaxial weave and multiaxial weave are suitable. Relatively open weaves are preferred because the electrical resistance is lower. Both the reinforcement threads and sacrificial threads can be either monofilament or multistranded.

The reinforcement members are composed of any number of suitable substances, preferably perhalocarbon polymer. As employed herein, the term "perhalocarbon polymer" refers to a polymer which has a carbon chain which may or may not contain ether oxygen linkages therein and which is totally substituted by fluorine or by fluorine and chlorine atoms. Preferably the perhalocarbon polymer is a perfluorocarbon polymer, as it has greater chemical inertness. Typically, such polymers include homopolymers made from tetrafluoroethylene and copolymers of tetrafluoroethylene with hexafluoropropylene and/or perfluoro(alkyl vinyl ethers) with alkyl being 1 to 10 carbon atoms, such as perfluoro(propyl vinyl ether). A most preferred reinforcement material is polytetrafluoroethylene (PTFE). Reinforcement threads made from chlorotrifluoroethylene polymers are also useful.

So as to have adequate strength in the fabric, the reinforcement threads suitably are of 5 to 600 denier, preferably 100 to 300 denier (denier is g/9000 m of thread). However, threads of such denier having a typical, round cross section, give membranes which are less satisfactory because they are too thick, especially at the thread junctions where the crossover of the threads thickens the reinforcing fabric to twice the thread thickness. In accordance with the preferred mode of the invention, fabric whose reinforcement members have the specified denier, but which also have a cross-sectional shape which is noncircular and which has an aspect ratio in the range of 2 to 20, preferably in the range of 4 to 10, are preferred. Aspect ratio means the ratio of the width of the reinforcement member to its thickness. Typical suitable cross-sectional shapes include rectangular, oval and elliptical. Rectangular members can be in the form of thin narrow ribbon slit or slit and drawn from film, or can be extruded, in which case the corners may be rounded. Oval, elliptical and other shapes can be extruded or made by calendaring fiber or yarn. It is also possible to calendar a fabric to provide the required aspect ratio, especially at the crossover points. A rectangular cross-section as described above is preferred. As the web of support material suitably has a thickness in the range of 50 to 125 micrometers, preferably 50 to 75 micrometers, the reinforcing members suitably have a thickness of 12 to 75 micrometers, preferably 25 to 38 micrometers. The fabric suitably has a thread count in the range of 1.6 to 16 reinforcement threads/cm in each of the warp and weft, though this is not critical. A thread count in the range of 3 to 8 reinforcement threads/cm is preferred.

Suitable threads of PTFE having substantially rectangular cross-section can be made by lubricant-assisted PTFE sheet extrusion, then slitting and stretching, or can be made by lubricant-assisted extrusion of flat PTFE filament and stretching, e.g., as described in U.S. Pat. No. 2,776,465.

The sacrificial members of the fabric are threads of any of a number of suitable substances, either natural or synthetic. Suitable substances include cotton, linen, silk, rayon, polyamides such as 6—6 nylon, polyesters such as polyethylene terephthalate, and acrylics such as polyacrylonitrile. Polyesters are preferred. The primary requirement of the sacrificial fibers is their removal without a detrimental effect on the polymer matrix. With this proviso, the chemical makeup of the sacrificial fibers is not critical. In similar fashion the manner of removal of the sacrificial fibers is not critical as long as this removal does not interfere with the ion exchange capability of the final polymer in the cation permeable separator. The sacrificial fibers are fibers which can be removed without a detrimental effect on either an intermediate polymer which is a precursor to a polymer possessing ion exchange sites or a polymer with ion exchange sites. The sacrificial fibers are removed from either polymer leaving voids without interfering with the ion exchange capability of the final polymer. The manner of removal of the sacrificial fibers should not affect the supporting fibers employed to reinforce the tear strength of the membrane. Care should be taken, however, not to have the sacrificial fibers extend from one surface of the membrane to the other, lest the non-porous membrane becomes a porous diaphragm. As such, it is preferred not to have the reinforcing fabric penetrate the surface of the membrane on the cathode side.

The sacrificial members, e.g., polyester threads, can suitably be of about 20 to 100 denier. They can have an aspect ratio in the range of 1 to 20, i.e., can have a rectangular, oval or elliptical cross-section, or if of low enough denier, can be of aspect ratio 1, i.e., circular in cross section. The sacrificial threads suitably have a thickness of 12 to 63 micrometers, preferably 25 to 38 micrometers. The sacrificial members may be monofilaments or multifilaments.

In each of the warp and weft, the ratio of sacrificial threads to reinforcement threads in the fabric is suitably in the range of 10:1 to 1:1. Preferred ratios of sacrificial to reinforcement fibers are in the range from 2:1 to 8:1, and the most preferred ratios are 4:1 and 8:1.

It is further preferred that there be an even number of sacrificial fibers for each reinforcement fiber. Although fabrics which have an odd number of sacrificial fibers for each reinforcement fiber can be used, they are not the preferred type. The reason for this preference can be seen by visualizing what happens in the case of a fabric of plain weave which has one sacrificial fiber for each reinforcement fiber; when the sacrificial fibers of the fabric are removed, the reinforcement fibers which remain are not in the configuration of a woven fabric; one set of fibers merely lies on the other, and while such is permissible under the invention, it is not preferred. It is, of course, possible in such cases to use special weaves which will remain woven after the sacrificial fibers are removed. So as to avoid the necessity for making such special weaves, fabrics which have an even number of sacrificial fibers for each reinforcement fiber are preferred.

The reinforcement fabric can be made such that the threads of high aspect ratio present are either twisted or not twisted, and if twisted, a suitable number of twists, so that a high aspect ratio is maintained, is up to about 5/cm, preferably 1 to 5/cm. The twist can be in the S or Z direction.

The membrane can be made from the component layers of film and the web of support material with the aid of heat and pressure. Temperatures of about 200° C. to 300° C. are ordinarily required to fuse the polymer films employed into adherent contact with each other, so as to form a unitary membrane structure encapsulating or adhering to the support material, and, when more than two films are used, to make adjacent sheets of film fuse together; the temperature required may be even above or below this range, however, and will depend on the specific polymer or polymers used. The choice of a suitable temperature in any specific case will be clear, inasmuch as too low a temperature will fail to effect an adequate degree of adherence of the films and to each other, and/or large voids will form between the films adjacent to the reinforcement members. If the temperature employed to fuse the layers is too high, excessive polymer flow leading to leaks and nonuniform polymer thickness. Pressures of as little as about $2 \times 10^4$ pascals, to pressures exceeding $10^7$ pascals, can be used. One type of apparatus, which is suitable for batch operations, is a hydraulic press, which ordinarily will use a pressure in the range of $2 \times 10^5$ to $10^7$ pascals.

Apparatus suitable for continuous preparation of membrane, and which was employed in the examples unless otherwise specified, comprised a hollow roll with an internal heater and an internal vacuum source. The hollow roll contained a series of circumferential slots on its surface which allowed the internal vacuum source to draw component materials in the direction of the hollow roll. A curved stationary plate with a radiant heater faced the top surface of the hollow roll with a spacing of about 6 mm between their two surfaces.

During a lamination run, porous release paper was used in contact with the hollow roll as a support material to prevent adherence of any component material to the roll surface and to allow vacuum to pull component materials in the direction of the hollow roll. Feed and takeoff means were provided for the component materials and product. In the feed means one idler roll of smaller diameter than the hollow roll was provided for release paper and component materials. The feed and takeoff means were positioned to allow component materials to pass around the hollow roll over a length of about 5/6 of its circumference. A further idler roll was provided for the release paper, allowing its separation from the other materials. Takeoff means were provided for the release paper and the product membrane.

For use in ion exchange applications and in cells, for example a chloralkali cell for electrolysis of brine, the membrane should have all of the functional groups converted to ionizable functional groups. Ordinarily and preferably these will be sulfonic acid and carboxylic acid groups, or alkali metal salts thereof. Such conversion is ordinarily and conveniently accomplished by hydrolysis with acid or base, such that the various functional groups described above in relation to the melt-fabricable polymers are converted respectively to the free acids or the alkali metal salts thereof. Such hydrolysis can be carried out with an aqueous solution of a mineral acid or an alkali metal hydroxide. Base hydrolysis is preferred as it is faster and more complete. Use of hot solutions, such as near the boiling point of the solution, is preferred for rapid hydrolysis. The time required for hydrolysis increases with the thickness of the structure. It is also of advantage to include a water-miscible organic compound such as dimethylsulfoxide in the hydrolysis bath.

Removal of the sacrificial fibers from the membrane can variously be done before, during or after hydrolysis of the original membrane in melt-fabricable form to the ion exchange form. Preferably the removal is done during or after hydrolysis, so the abrasion is carried out on the unhydrolyzed form of the polymer.

Removal of sacrificial members from a membrane leaves channels in the membrane at the sites originally occupied by the sacrificial members. These channels extend in general from the window areas to the shadowed or blind areas, where the reinforcing members are proximate to the layer of fluorinated polymer which, in the preferred case, has carboxylic functional groups.

The channels suitably have a nominal diameter in the range of 1 to 50 micrometers. This nominal diameter is the same as that of the sacrificial fiber, the removal of which results in formation of the channel. It is believed that the actual diameter of a channel can change, shrinking or collapse when the membrane is dehydrated, and swell when the membrane itself is swollen. Ordinarily the channels left by removal of sacrificial threads of a fabric are in the range of 10 to 50 micrometers in diameter.

For membranes with single layers of fluorinated polymer, the membrane is prepared so that the web of support material does not penetrate the surface of the membrane which will be exposed to the anolyte. For membranes with two or more layers of fluorinated polymer, the membranes of the invention are prepared so that the web of support material does not penetrate through the layer of fluorinated polymer which preferably has carboxyl functionality, but lies at least predominantly in another layer of fluorinated polymer which has carboxyl and/or sulfonyl functionality, and preferably in the second layer of fluorinated polymer which has carboxyl and/or sulfonyl functionality, which second layer is ordinarily on the surface of the membrane to be abraded. This can be accomplished by first melt extruding a bifilm of, in the preferred case, carboxyl precursor and sulfonyl precursor, and placing the reinforcement between the sulfonyl layer of this bifilm and another sulfonyl film, so that during lamination the fabric will remain almost entirely in the bonded sulfonyl layer. In any event, the surface with a carboxyl layer or the surface with the higher equivalent weight of two carboxyl layers or two sulfonyl layers customarily faces toward the cathode during electrolysis.

The membranes described herein can also be modified on either surface or both surfaces thereof so as to have enhanced gas release properties, for example by providing optimum surface roughness or smoothness, or, preferably, by providing thereon a gas- and liquid-permeable porous non-electrode layer. Such nonelectrode layer can be in the form of a thin hydrophilic coating or spacer and is ordinarily of an inert electroinactive or nonelectrocatalytic substance. Such non-electrode layers and their application are described in U.S. Pat. No. 4,909,912, discussed above.

The equipment for abrading the anode-facing surface of the membrane is not critical. One can use sandpaper, emery paper, carbide paper, rough metal, rough ceramic, rough stone, sandblasting, brushing by a wire brush, surface etching, ultraviolet irradiation or treating by gas flame or hot air or the like, provided there is a way to apply uniform abrasion over the whole surface of the membrane. Paper-backed sandpaper is preferred over cloth-backed sandpaper. The abrading with sandpaper can be by manual, rotary sander, or belt sander, for example. A belt sander, if well built, gives very good control of the uniformity of abrading the entire membrane, and can be operated continuously. It also tends to be self-cleaning, throwing aside the debris that is generated.

The abrading process variables are not critical. These variables include grit size of the sandpaper or abrading surface, pressure, speed of the abrasive surface, number of passes and operating temperature. (In some machines, one controls the clearance between the abrasive surface and the backup roll instead of controlling pressure.) What is critical is the net effect of all the above variables. One must select a workable combination of the above variables to expose the sacrificial reinforcement at some crossover points or junctions. The abrasion must be severe enough to expose at least about 25% of the junctions involving at least one sacrificial fiber, but not severe enough to loosen enough fibers to create groove-like channels, cause pin-holes, or cause the sheet to tear during handling, hydrolysis (if necessary), drying, packaging, and shipping. Preferably the percentage of junctions involving at least one sacrificial fiber exposed is about 25 to 75%, most preferably 30 to 50%. The percentage of junctions exposed is based on the total number of junctions involving at least one sacrificial fiber. The percentage of junctions that are exposed is determined by examining the membrane with a microscope. It is also possible to determine the percentage of exposed junctions by using a profilometer.

It is possible to abrade the membrane either before (preferably) or after hydrolysis from the precursor or melt-fabricable form to the ion exchange form, which may be the free acid form (H) or a salt form such as the Na or R salt form.

It has been pointed out above that a non-electrode coating on one or both surfaces of a membrane helps reduce cell voltage, probably by helping the disengagement of gas. If such a coating is desired, it can be applied after the abrasion process. The abraded product of this invention has somewhat lower physical properties than the unabraded controls. Tear strength is most affected, being about half that of the controls. However, it is believed that the tear strength is still fully adequate for electrolysis of brine, even in the largest commercial cells.

The electrolytic cell can have two or three compartments, or even more. If three or more compartments are used, the membrane is commonly placed next to the cathode compartment, and the other dividers may be porous diaphragms or membranes based on polymers having pendant side chains with terminal —$CF_2$—$SO_3Na$ groups only. The cells may be connected in series (so-called bipolar cells) or in parallel (so-called monopolar cells). The membrane may be disposed horizontally or vertically in the cell, or at any angle from the vertical.

Any of the conventional electrodes or electrode configurations may be used. For chloralkali cells, the anode should be resistant to corrosion by brine and chlorine and to erosion and preferably should contain an electrocatalyst to minimize chlorine overvoltage. A commercially available anode known as dimensionally stable anode is one of those that are suitable. A suitable base metal is titanium, and the electrocatalysts include reduced platinum group metal oxides (such as Ru and the like), singly or in mixtures, optionally admixed with a reduced oxide of Ti, Ta, Cb, Zr, Hf, V Pt, or Ir. The electrocatalysts may be heat treated for stability.

The operation of the electrolytic cell is known in the art. Generally, the size and configuration of the electrolytic cell and the membrane contained therein are not important and may be adjusted to accommodate the needs of the operator.

EXAMPLES

EXAMPLE 1

This example shows the kind of routine testing used to find a satisfactory set of conditions for a particular membrane and a particular machine. It also shows the improvement in current efficiency achieved by the use of the abraded membrane of the present invention. The membrane used had on the cathode side 37 micrometers of the copolymer of tetrafluoroethylene ("TFE") and $CF_2$=$CFOCF_2CF(CF_3)OCF_2CF_2COOCH_3$ with equivalent weight 1070 (calculated on the COOH form); on the anode side was 100 micrometers of the copolymer of TFE and $CF_2$=$CFOCF_2CF(CF_3)OCF_2CF_2SO_2F$ with equivalent weight 1080 (calculated on the $SO_3H$ form); plain weave fabric with a warp of 200 denier paste-extruded, stretched, and slit PTFE/10 threads per inch in the Z direction, along with 8 strands of 40 denier Dacron ® Polyester fiber/5 tpi in the Z direction; the warp was the same as the fill; both had one end of PTFE per 4 ends of Dacron ®; the fabric was heat set and calendered; 25 micrometers of the copolymer of TFE and $CF_2$=$CFOCF_2CF(CF_3)OCF_2CF_2SO_2F$ with equivalent weight 1080, in unhydrolyzed form. The membrane sheet was 1.4 m wide and the anode side of the membrane was abraded. The sanding machine was a face-finishing machine, also used for standard textile operations such as "sueding" leather. The sanding machine continuously abraded the sample with a rotating sandpaper drum. The membrane was backed up by a moveable rubber roll, which adjusts the clearance between the rotating sandpaper roll and the membrane.

All membranes abraded with 320 grit sandpaper were inadequately roughened, with less than about 4% of the total crossover points exposed after one pass through the sander. The percentage of exposed cross-over points was determined by examining the membrane with a microscope.

Using 180 grit sandpaper, 90 micrometers penetration gave non-uniform results from one side of the sample to the other with one pass, but two passes were adequate, giving exposure of about 30% of the crossover points involving at least one sacrificial fiber.

Penetration is defined as the difference between membrane starting thickness and the actual machine clearance setting (rubber roll to sandpaper). The rubber roll is elastic, so the sandpaper is not really penetrating into the membrane to the depth measured as penetration. A rubber roll of less than 55 durometer hardness was used.

With 140 micrometer penetration, the two-pass sample was more uniform than the one-pass sample, giving about 55% exposure of crossover points involving at least one sacrificial fiber, but there was evidence of slight tearing of the fabric channels in the machine direction.

With 7.5 mil penetration, machine direction tearing could be seen along some fabric channels with 2 passes. The abrasion was judged to be the maximum preferred, about 75%.

Prior to electrolysis, the membranes were hydrolyzed in a solution of 10% KOH, 30% dimethylsulfoxide, 70% $H_2O$ for 30 minutes at 80°-90° C. and rinsed with water.

Electrolysis tests were carried out to compare the membranes abraded with 180 grit, penetration 90-140 micrometers vs. the starting (unabraded) membrane. The voltage measurements were corrected to standard conditions. Table 1 shows the results on voltage and current efficiency. Note that the current efficiency for the abraded membrane is distinctly improved, without any increase in cell voltage.

TABLE 1

| Cell Test Results | | | |
|---|---|---|---|
| 0.45 $dm^2$ electrolytic cell, 3 mm Gap, Mild Steel Cathode dimensionally stable anode | | | |
| 3.1 kA/m, 90° C., 32% W/W NaOH, 200 grams per liter Brine | | | |
| Property | Abraded | Control (unabraded) | Delta |
| Voltage | 3.374 | 3.379 | −0.005 |
| CE % | 95.740 | 95.080 | 0.660 |

CE = current efficiency

EXAMPLES 2–4

This example confirms the results of Example 1. This example uses a different starting membrane, having on the cathode side 25 micrometers of the copolymer of TFE and $CF_2$=$CFOCF_2CF(CF_3)OCF_2CF_2COOCH_3$ with equivalent weight 1070 (calculated on the COOH form); on the anode side was 100 micrometers of the copolymer of TFE and $CF_2$=$CFOCF_2CF(CF_3)OCF_2CF_2SO_2F$ with equivalent weight 1080 (calculated on the $SO_3H$ form); the support cloth is comprised of Goretex ® yarn with 200 denier and 10 threads per inch in the Z direction and Dacron ® yarn with 40 denier per 8 strands and 5 threads per inch in the Z direction, such cloth being constructed with one end of Goretex ® per 4 ends of Dacron ® with a plain weave; 25 micrometers of the copolymer of TFE and $CF_2=CFOCF_2CF(CF_3)OCF_2CF_2SO_2F$ with equivalent weight 1080; both sides of the membrane having a non-electrode coating of $ZrO_2$. Sanding (before non-electrode coating) was carried out in the same way as in Example 1 except the penetration was 150–175 micrometers. Current voltage is reported in Table 2 and current efficiency is reported in Table 3.

TABLE 2

Cell Voltage
0.45 dm² electrolytic cell, 3 mm Gap, Mild Steel Cathode
dimensionally stable anode
3.1 kA/m, 90° C., 32% W/W NaOH, 200 grams per liter Brine

| Example | No. of Cell Tests | Abraded Voltage | Control (unabraded) Voltage | Delta Voltage |
|---|---|---|---|---|
| 2 | 3 | 2.956 | 2.976 | −0.020 |
| 3 | 1 | 3.040 | 3.053 | −0.013 |
| 4 | 1 | 3.019 | 3.047 | −0.028 |
| Overall Avg. | | 3.005 | 3.025 | −0.020 |

TABLE 3

Current Efficiency
0.45 dm² electrolytic cell, 3 mm Gap, Mild Steel Cathode
dimensionally stable anode
3.1 kA/m, 90° C., 32% W/W NaOH, 200 grams per liter Brine

| Example | No. of Cell Tests | Abraded Avg. CE % | Control (unabraded) Avg. CE % | Delta CE % |
|---|---|---|---|---|
| 2 | 3 | 97.66 | 96.65 | 1.01 |
| 3 | 1 | 97.37 | 96.97 | 0.40 |
| 4 | 1 | 96.77 | 96.18 | 0.59 |
| Overall Avg. | | 97.27 | 96.6 | 0.67 |

The data show the sanding caused an average voltage decrease of 20 millivolts, which is regarded as statistically insignificant; but the current efficiency was increased by 0.67%.

EXAMPLE 5

The starting material for this example was the same as that for Example 2 except there was no non-electrode coating on either side of the membrane. Sanding conditions were the same as for Example 2.

TABLE 4

0.45 dm² electrolytic cell, 3 mm Gap, Mild Steel Cathode
dimensionally stable anode
3.1 kA/m, 90° C., 32% W/W NaOH, 200 grams per liter Brine

| Property | Abraded | Control (unabraded) | Delta |
|---|---|---|---|
| Voltage | 3,420 | 3.410 | 0.010 |
| CE % | 96.400 | 95.890 | 0.510 |
| WT moles H₂O/Na | 3.591 | 3.738 | −0.147 |

EXAMPLE 6

The starting material for this example was the same as for Example 2 except the membrane was uncoated on the anode side. Sanding conditions were the same as for Examples 2 and 3. The results confirm those of the other examples-improvement in current efficiency with substantially no change in cell voltage.

TABLE 5

0.45 dm² electrolytic cell, 3 mm Gap, Mild Steel Cathode
dimensionally stable anode
3.1 kA/m, 90° C., 32% W/W NaOH, 200 grams per liter Brine

| Property | Abraded | Control (unabraded) | Delta |
|---|---|---|---|
| Voltage | 3.043 | 3.033 | 0.010 |
| CE % | 97.370 | 97.250 | 0.120 |
| WT moles H₂O/Na | 3.640 | 3.865 | −0.225 |

EXAMPLE 7

The starting material for this example was the same as that for Example 2. The difference was that a slightly different cell was used, and the current density was an unusually high 6.0 kA/m2. Sanding conditions were the same as for Examples 2 and 3. Electrolytic conditions were as follows:

0.5 dm2 cell; 32% NaOH; 84° C.; 200 grams per liter depleted brine concentration exit brine;

400 mm cathode head; punched plate DSA anode (circular for test specimen and diamond shaped holes for control); activated cathode; zero gap; and startup 0 to 6.0 kA/m2 in 10–20 minutes.

The electrolysis test results showed substantially no change in voltage, and an improvement in current efficiency from 96.9% for the control to 97.5% for the abraded membrane.

What is claimed is:

1. A reinforced fluorinated cation exchange membrane for use in an electrolytic cell having an anolyte and a catholyte comprising one or more polymer layers reinforced with fabric containing both sacrificial and permanent fibers in which at least some of the fabric is in a polymer layer facing said anolyte, said fabric having reinforcement crossover points and of the reinforcement crossover points involving at least one sacrificial fiber on the surface of said polymer layer facing said anolyte where said polymer layer facing said anolyte is abraded to at least a depth which is greater than the distance between said anolyte facing polymer layer and said fabric and where at least 25% of the crossover points are exposed.

2. The membrane of claim 1 in which the polymers are perfluorinated, and the percentage exposed crossover points involving at least one sacrificial fiber is 30–50%.

3. The membrane of claim 2 in which the membrane has two or more layers and the polymer layer facing the catholyte is a carboxylic polymer and the polymer layer facing the anolyte is a sulfonic acid polymer.

4. An electrolytic cell comprising an anolyte and a catholyte and a reinforced cation exchange membrane having one or more polymer layers, reinforced with fabric containing both sacrificial and permanent fibers in which at least some of the fabric is in a polymer layer facing said anolyte, said fabric having reinforcement crossover points and of the reinforcement crossover points involving at least one sacrificial fiber on the surface of said polymer layer facing said anolyte where said polymer layer facing said anolyte is abraded to at least a depth which is greater than the distance between said anolyte facing polymer layer and said fabric and where at least 25% of the crossover points are exposed.

5. An electrolytic cell of claim 4 which is used for electrolyzing of an alkali halide solution.

6. An electrolytic cell of claim 5 in which the alkali halide solution is an aqueous solution of sodium chloride or an aqueous solution of potassium chloride or mixtures thereof.

* * * * *